Figure 1A:
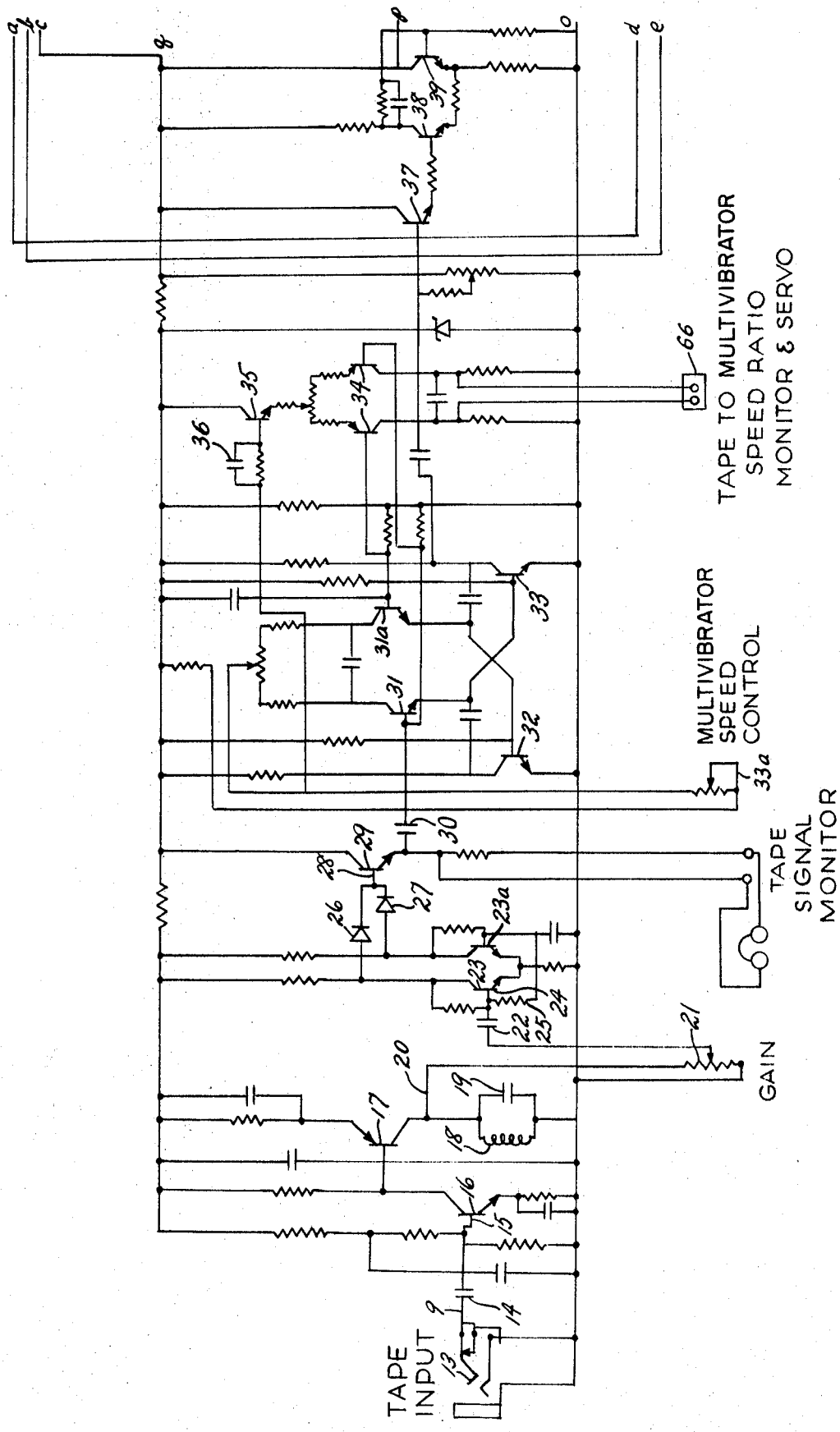

United States Patent

[11] 3,583,796

[72] Inventor Jesse L. Colodner
 Pearl River, N.Y.
[21] Appl. No. 773,465
[22] Filed Nov. 5, 1968
[45] Patented June 8, 1971
[73] Assignee The Synchronex Corporation
 New York, N.Y.

[54] SYNCHRONIZATION OF PRE-RECORDED AUDIO TAPE SIGNALS OF MOTION PICTURE FILM
2 Claims, 4 Drawing Figs.

[52] U.S. Cl. .................................................. 352/19
[51] Int. Cl. ...................................................... G03b 31/02,
 G03b 31/04
[50] Field of Search ........................................... 352/12, 19,
 20; 179/100.2 T

[56] References Cited
UNITED STATES PATENTS
3,297,835 1/1967 Colodner ..................... 200/11
3,429,640 2/1969 Machtig ....................... 352/12
FOREIGN PATENTS
1,161,130 8/1961 Germany ..................... 352/19

Primary Examiner—Louis R. Prince
Assistant Examiner—Denis E. Corr
Attorney—Charles E. Temko ABSTRACT: Apparatus for synchronizing sound on a film strip with the frames on the film strip, used where sound was first recorded separately from the film on a sound tape and at the same time pulses were also recorded on the sound tape, the repetition rate of which pulses correspond to the film speed in the camera when the film was exposed. The apparatus achieves synchronization by controlling the relative speeds of, one, a tape transport, which transport generates an electrical signal of the recorded sound and, two, the film speed of the recording device which is putting the electrical signal of the recorded sound on the magnetic sound track of the previously exposed and developed film. The control of the relative speeds of the tape and film is accomplished by comparing the repetition rate of pulses generated from the pulse record on the sound tape to the repetition rate of pulses which are generated by the film in the device which is putting the sound signal on the magnetic sound track.

SYNCHRONIZATION OF PRE-RECORDED AUDIO TAPE SIGNALS OF MOTION PICTURE FILM

This invention relates generally to the field of motion picture sound recording, and more particularly to an improved means for synchronizing the previously tape recorded audio portions of a photographed motion picture scene onto the completed magnetically striped film, so that the film may be projected in a conventional magnetic sound projector.

In my prior U.S. Pat. No. 3,297,835, dated Jan. 10, 1967, there is disclosed a motion picture camera having switch means driven by the film advance mechanism of the camera in such manner as to create an electrical pulse from an energy source, and transmitted to a remote point for use. The invention contemplates the use of a separate tape recorder, which is operated simultaneously with operation of the camera in such manner that two tracks of recording are simultaneously made, one of which records the pulses referred to in synchronism with the exposure of individual frames on the film, and the other of which records the received audio signals on a separate parallel track. It is known in the art to subsequently project the developed film in synchronism with a replaying of the tape, utilizing the recorded signals to synchronize the tape and projector, but devices of this type have been difficult to synchronize, and suffer from a disadvantage in that very often during the simultaneous filming and taping by the user, the tape has been played back by the operator to assure himself that it is functioning properly, or to check recording level, and in such case synchronism between the tape and the film is lost at the end of the filming of one or more scenes. Since the average amateur motion picture load carries 20 to 30 such scenes, the maintenance of synchronism between tape and film for the entire length of the film is not a practical matter.

The present invention contemplates the simultaneous photographing and sound recording, using a separate tape recorder which records both continuous pulses corresponding to the exposure of individual frames and the received audio signal. When the exposed motion picture film has been processed, either by reversal or printing methods, it is subsequently processed for the recording of the audio signals from the simultaneously exposed tape by the application of a magnetic stripe along one edge of the film. Subsequently, the signals from the tape are transferred to the magnetic stripe on the film, on a synchronized scene by scene basis prior to return to the user. If desired, the film may be subsequently edited in the normal manner, since synchronization between sound and film is permanently fixed on a frame by frame basis. Subsequent projection by the user requires no adjustments at the time of projection, thereby facilitating the use of the invention by those possessed of only ordinary skills.

The application of sound striping to previously processed motion picture film, and the subsequent addition of sound onto the magnetic stripe is known in the art, and has heretofore been practices on a relatively limited scale using relatively expensive, professional type equipment. In the case of relatively inexpensive amateur equipment, several problems have arisen which are not conveniently solved while remaining within the price range of such equipment. One problem arises from the fact that the synchronizing signal which is placed on one of the tracks of the tape recorder can not be out of the audible range as the recording capability of relatively inexpensive recorders usually limit the upper and lower frequency response to this area. While placing a signal on one track, to prevent crosstalk, the synchronizing signal must be of a low amplitude.

Another problem arises from the fact that the speeds of either electrically driven or spring driven inexpensive cameras are normally not very constant, and the variation in size and length of impulses generated by the cameras vary greatly. Other problems arise from the presence of frequency variation of oscillator circuits in the tape recorder supplying pulse signals, wide variations of amplitude of the pulse signals, and even missing information caused by poor electrical contact of the switch located within the camera, creating corresponding to apparently missing sprocket holes on the film.

It is therefore among the principal objects of the present invention to provide improved means which may be used by a commercial processor of motion picture film which enables the elimination of the above mentioned problems.

Another object of the invention lies in provision of synchronizing means used in conjunction with the transfer of tape signals to processed magnetically striped film which will compensate for frequency and amplitude variations in pulse signals, and supply missing information resulting from missing signals, based upon the frequency of received signals.

Yet another object of the invention lies in the provision of improved synchronizing means of the class described, in which the cost of fabrication thereof may be of a reasonably low order, thereby permitting consequent wide sale, distribution and use.

These objects, as well as other incidental ends and advantages, will more fully appear in the progress of the following disclosure, and be pointed out in the appended claims.

Briefly stated, the disclosed embodiment of the invention contemplates the filtering of the input pulse signals to compensate for distortion, and noise, and the supplying missing pulses using ring counter circuits. The film being recorded also supplies signals based upon the passage of sprocket holes, which are fed to a separate ring counter circuit. Means is provided to compare the signals received from each of two counter circuits, and to compensate the speed of the moving tape to achieve proper synchronization.

Figure 1B:
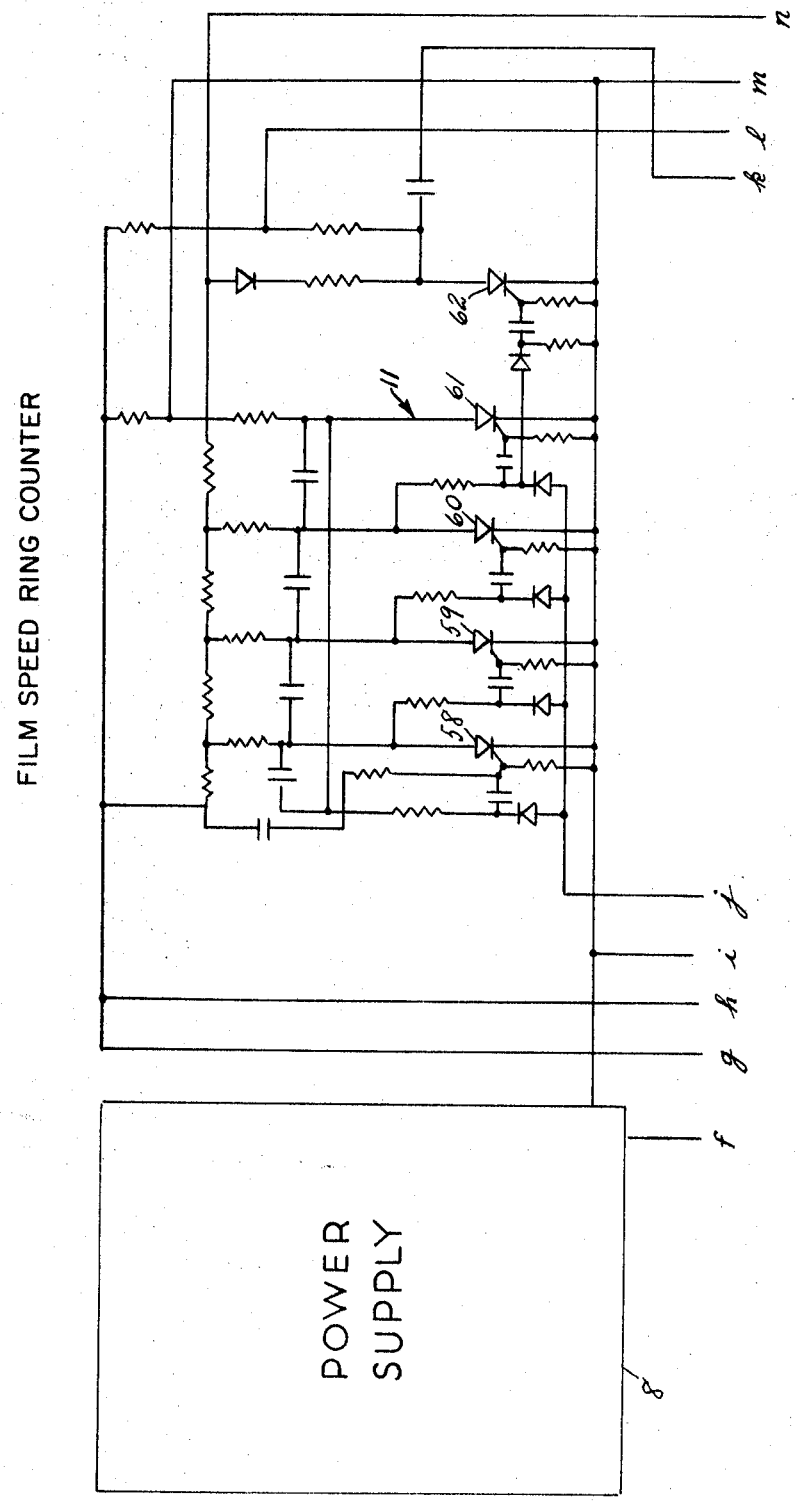
Figure 1C:
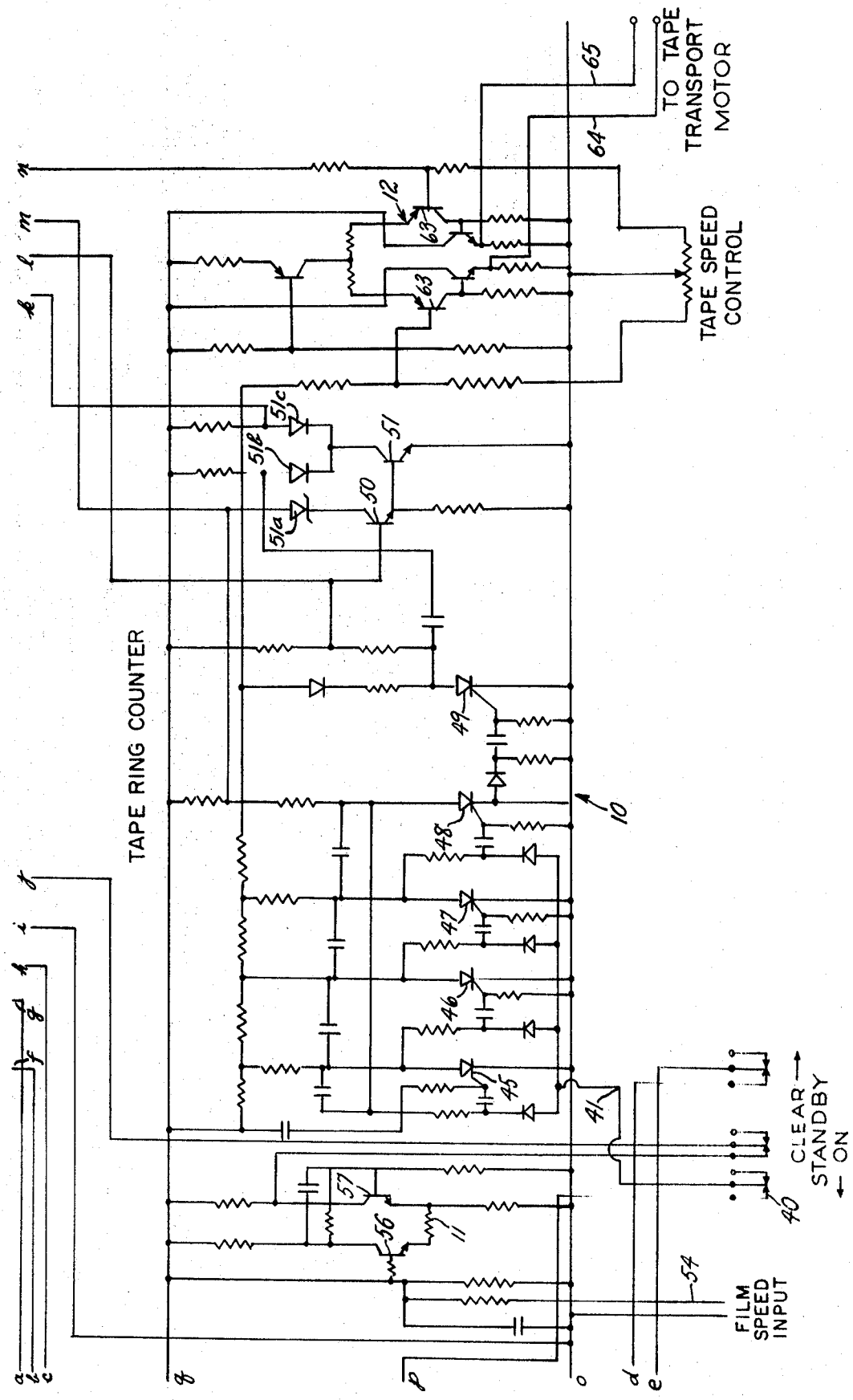

In the drawing, to which reference will be made in the specification, FIGS. 1A, 1B, and 1C, are a schematic wiring diagram of an embodiment of the invention.

Figure 2:
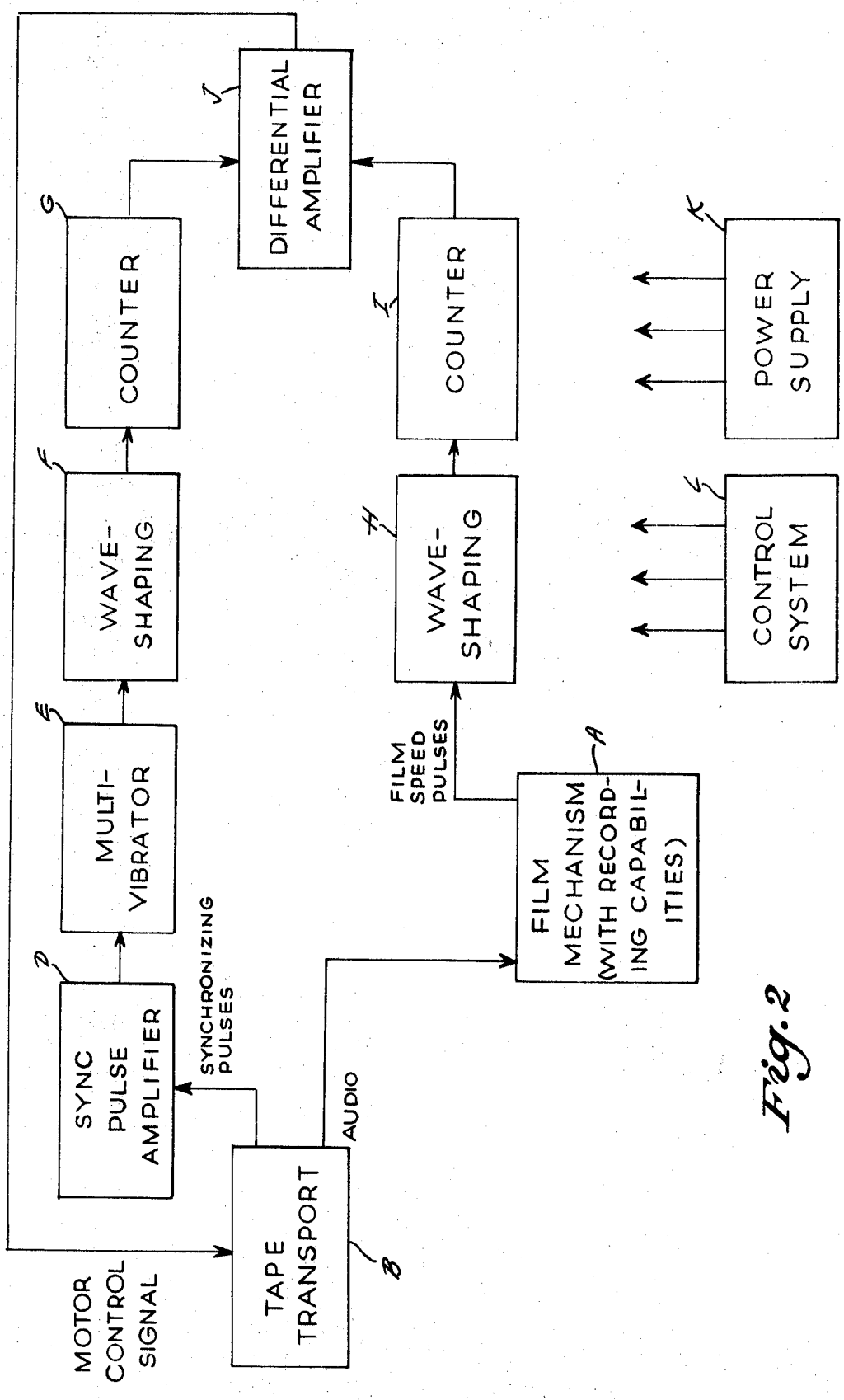

FIG. 2 is a block diagram of the embodiment.

Before entering into a consideration of FIGS. 1A, 1B, and 1C, the operation of the embodiment may be more readily comprehended by consideration of FIG. 2. The processing of an individual roll of film and accompanying sound tape involves receiving synchronizing pulses and the audio record from the prerecorded tape, recording the audio onto a magnetically striped track on the motion picture film, and achieving proper synchronization of the audio information with the frames on the film. This is accomplished by comparison of the synchronizing pulses from the prerecorded tape with the film speed information derived from a film advance mechanism A, and using the result of this comparison to regulate the speed of the transport mechanism B. This will establish the proper relationship between the film and the tape at the start of a filming sequence and will maintain this relationship during the remainder of the sequence.

The prerecorded tape is played back on a standard tape transport modified for use in accordance with the present invention. The modifications include a means for controlling the speed of the tape drive motor by electronic signals, and provision for the output of both the audio and synchronizing tracks. The audio output is fed to the recording circuits of the film mechanism or device used to record the audio onto the sound track of the film. The synchronizing output of the tape transport mechanism B in the form of audio pulses is routed to a sync pulse amplifier D.

The sync pulse amplifier D includes a number of circuits for the processing of the synchronizing pulses. These pulses are first amplified to the desired level. The pulses are then filtered for a specific range of frequencies, and noise reduction is accomplished by thresholding techniques. Further amplification at the output, supplies the drive required by the multivibrator E at a next stage. The sync pulse amplifier D also provides an output for monitoring of the synchronizing pulses.

The multivibrator E consists of a basic free-running oscillator that is controlled by the signals received from the sync pulse amplifier D. It provides an output at the same rate as the synchronizing pulses. An output will also be supplied by the free-running oscillator whenever a few of the synchronizing pulses are missing from the prerecorded tape. The result of this circuitry contained within the sync pulse amplifier D and multivibrator E is that synchronization of the prerecorded tape and the film frames can be maintained even though the synchronizing pulses have been degraded with noise, amplitude and frequency variations, or occasional missing pulses.

The output of the multivibrator E is fed through a waveshaping circuit F to obtain a square wave, before application to a counter circuit G. Pulse signals which are proportional to the film speed are also fed through a similar shaping circuit H before reaching a separate counter circuit I. Both of the identical counter circuits are of a four-stage ring type. An automatic resetting provision, described hereinafter, is added to the basic ring counter circuit to correct for any timing lag (film or tape) and to prevent false speed control information from being sent to the succeeding stages of the system. The counter circuits G and I provide outputs of specific voltage levels corresponding to the registered count which is an indication of the relative speeds of the tape and film.

The outputs from each of the counter circuits are compared in a differential amplifier J. From this comparison, signals are developed which are used to vary the speed of the tape transport mechanism B in maintaining system synchronization. The basic speed of the tape transport is also controlled by the differential amplifier J. When the synchronization is achieved, and no correction to the tape speed is required, this basic or reference speed will be sent to drive motor of the tape transport B, which receives a standardized line voltage from an external source. The differential amplifier J supplies additional positive or negative voltage for regulation.

The power supply K furnishes the various voltage levels required by the circuitry. A control system L consists of the various rate and adjustments and the switching arrangements necessary to the operation of the system.

In this system, the tape mechanism B is slaved by the electronic circuitry to the speed of the film advancement mechanism A which is relatively fixed. Normally, during the process of recording the audio record onto the film sound track, the film mechanism A is manually set to a speed similar to that of the camera exposure speed and the tape speed is made to follow the film advancement. However, the film could be controlled by starting, stopping, and speed regulation by use of logic signals derived from the basic circuitry.

Referring to the drawing, FIGS. 1A, 1B, and 1C, the device comprises broadly: power supply means 8, tape signal filtering and amplifying means 9, a first ringing counter circuit 10, a second ringing counter circuit 11 and comparator means 12. A pulse signal from a prerecorded tape is inserted at input 13, and is subsequently transmitted to capacitor 14 and to the base 15 of a transistor 16 where the same is amplified. The pulse will normally be a three kilocycle pulse of 100 millivolt amplitude in a burst proportional to the speed of the camera. The signal then passes to a second amplifying stage at transistor 17. An inductive coil 18 and a capacitor 19 comprise a tuned circuit which allows all information not wanted and carried by the signal to be passed to ground, and allows only the three kilocycle amplified signal to pass through a conductor 20 to a variable resistor 21 which determines the gain. The signal continues through a coupling capacitor 22 to transistors 23a. This stage constitutes a differential amplifier. The signal enters the base of one side 24 of the transistor 23 for amplification. The signal is also fed through a resistor 25 to a transistor 23a where it is again amplified 180°out of phase. Both amplified signals are driven through diodes 26 and 27 which clip the bottom half of the signal, and allow only the positive portion to be applied to the base 28 of a transistor 29 which is used to isolate noise from the differential amplifier stage.

The signal is continued through a coupling capacitor 30 to transistor 31a, 32, and 33 which comprise a multivibrator or stage, the frequency of which is controlled by the input signal, and which maybe be manually adjusted by a variable resistor 33a. This circuit operates on the tape pulse signal after it has been filtered and shaped to more useable form, and supplies a stabilizing function even when some of the synchronizing pulses are missing or inadequate. Transistors 31, 31a, and 35 form a monitoring circuit of the multivibrator operation and transistors 37, 38, and 39 apply wave-shaping. The resultant signal is applied through a mechanical switch 40 and conductor 41 to the first ring counter 10.

Transistors 34a form a differential amplifier, and receive a signal from the multivibrator stage during the conducting period from transistor 35. A capacitor 36 allows a square wave, during the conducting period, to be applied a transistor 37 which serves as a decoupling component to drive transistors 38 and 39. The signal, now inverted, is applied through a mechanical switch 40 and conductor 41 to the first ringing circuit 10.

This circuit operates on the tape pulse signal, after it has been filtered and shaped to more usable form, and supplies a stabilized signal, even where some of the pulses are missing or inadequate. The function of the circuit is similar to that discussed in Pulse & Digital Circuits, by Millman & Taub, pages 52—57; and 505—506, McGraw-Hill, New York City, 1956. The circuit includes five silicon controlled rectifiers, 45, 46, 47, 48 and 49. As each is fired, corresponding resistors are allowed to conduct thereby giving variations in voltage of one-half volt per resistor to differential amplifier transistor 63. Transistors 50, 51, and silicon controlled rectifiers 51a a51band 51c form part of an automatic reset circuit, referred to herein above, and become conductive when a loss of synchronization occurs between the tape signal and the projector signal. The projector (not shown) which records the audio signal on the developed film, (after magnetic striping has been applied) is also provided with a pulse generating mechanism, similar to that in the camera. The pulse output is fed to an input 54, and could be directly compared with the output of the tape recorder ringing counter, since the limitations of the tape recorder signal are not normally present in the projector. However, I have found it convenient to use a separate ringing counter to shape the projector pulses to correspond to those of the tape recorder for convenient Comparison. The projector signal is fed through transistors 56 and 57 to the second ring counter element which also includes five silicon controlled rectifiers 58, 59, 60, 61 and 62. The signal exiting therefrom is summed with the tape signal in a differential amplifier 63, and the differential output voltage is transmitted through conductors 64 and 65 to be superimposed, negatively or positively through monitor and servo 66 on the tape recorder motor voltage to result in slowing the motor (not shown) separately supplied or speeding it above its normal operation in order to achieve perfect synchronization with the film.

It will be observed that by use of the above described circuitry, the tape signal has been amplified and filtered to allow only wanted information to be passed. The amplitude of the signal is not critical, but durations of time are utilized to vary the speed of the multivibrator circuit. Should, for any reason, the original input signal be too low, too distorted, missing, or saturated with noise, the circuit will continue to provide the proper corrective information by utilizing only those signals which were previously acceptable. If for any reason, either the film or the tape slip by increments of one frame, the ring counter circuits, because of built in memory effect, will correct for any period of slippage.

I wish it to be understood that I do not consider the invention limited to the precise details of structure shown and set forth in this specification, for obvious modifications will occur to those skilled in the art to which the invention pertains.

I claim:

1. In a film recording device for recording synchronized audio signals upon a magnetically striped motion picture film by utilizing a synchronized pulse, previously recorded on tape, in synchronism with the exposure of individual frames on said film, the improvement comprising: means for receiving a pulsed input from said tape, means for receiving a pulsed input from said recording device corresponding to individual sprocket holes in said film, means for filtering synchronizing pulses from said tape from unwanted noise, a ring circuit receiving filtered pulses from said tape and having a stabilized output of frequency corresponding to the frequency of tape input signals, differential amplifier means for comparing the output of said ring circuit with a pulsed signal output from said film recording device and means, for utilizing the output of said differential amplifier means for regulating the speed of said tape in relation to the speed of film advancement.

2. Structure in accordance with claim 1, further characterized in the provision of s second ring circuit receiving pulsed signals from said film recording device, and having an output leading to said differential amplifier means.